Patented Sept. 29, 1942

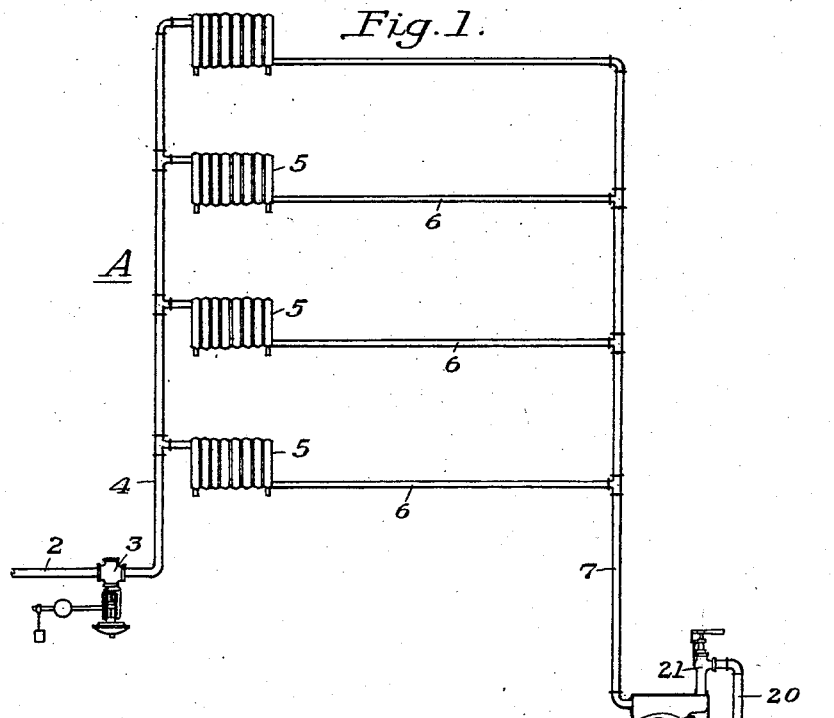
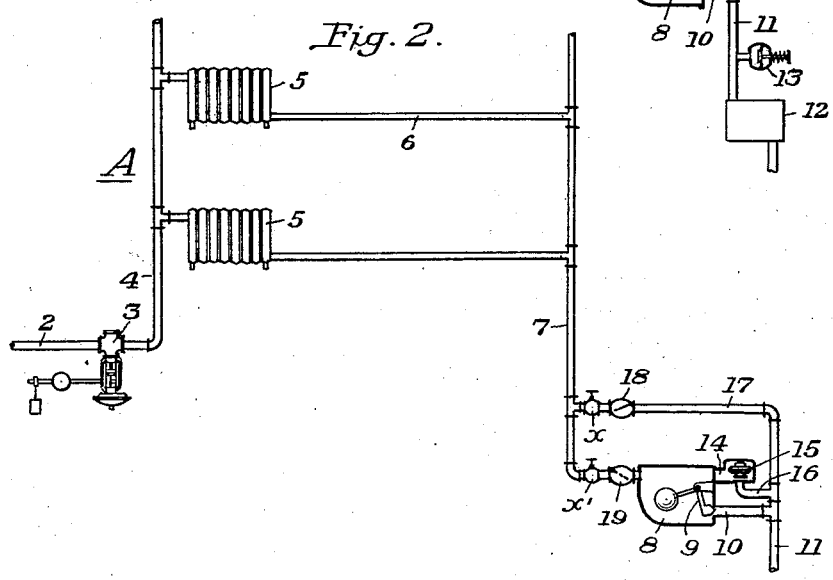

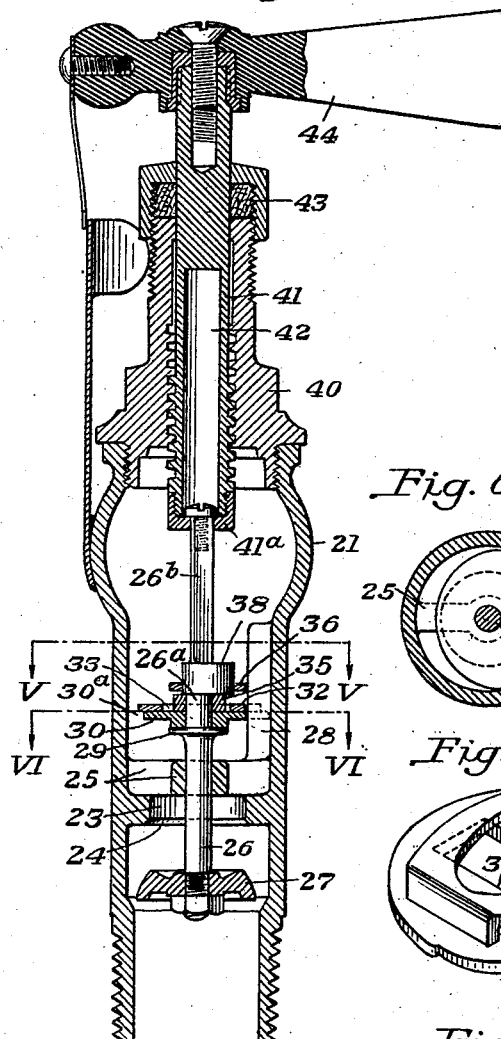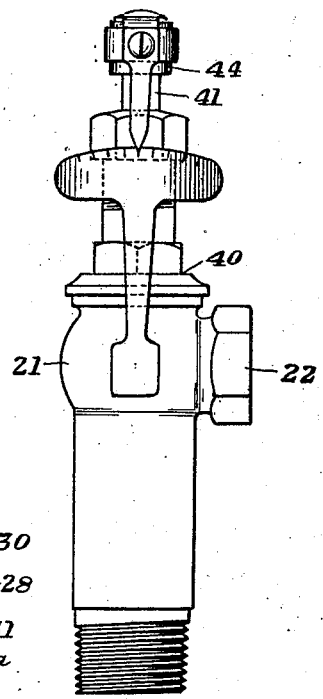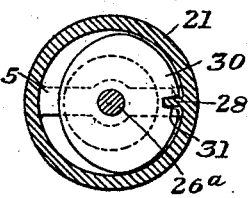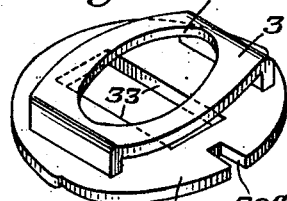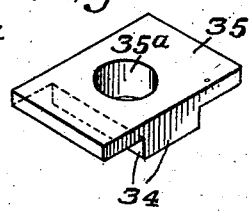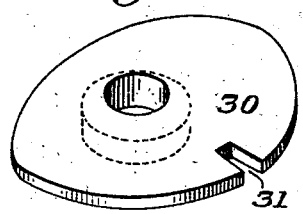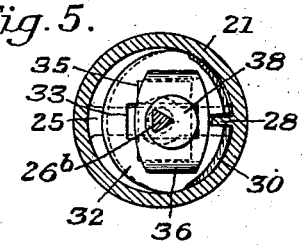

2,296,995

UNITED STATES PATENT OFFICE 2,296,995

STEAM HEATING SYSTEM

Bernard J. Ingram, Bellevue, Pa., assignor of one-half to E. H. Haupt, Bethel Township, Allegheny County, Pa.

Application January 31, 1940, Serial No. 316,571

6 Claims. (Cl. 237—68)

This invention pertains to heat exchange equipment and is for a system wherein the condensation of steam to water is utilized as a source of heat in a heat exchanger. The invention is applicable to heating systems for buildings wherein radiators are the heat exchange units or to systems for heating water in artificial swimming pools wherein steam coils constitute the heat exchange unit or to other heating systems using steam coils or circulating devices for the purpose of producing heat from steam as a fluid.

Steam heating systems utilizing radiator coils and the like through which steam is circulated as heat exchange elements are commonly arranged so that the heat exchanger has two connections, one being an inlet connection through which the steam is supplied to the heat exchanger and one being an outlet connection from which waste steam and condensate is discharged. In such systems it is common to provide a pressure regulating valve in the steam supply connection to control or regulate the pressure at which steam is admitted to the heat exchanger. It is common in said systems to provide a condensate trap in the outlet line and a vacuum pump is often used at the discharge side of the condensate trap. The condensate trap comprises an enclosed vessel having a chamber therein for the collection of condensate and having a float valve therein, the arrangement being such that when a predetermined amount of water has collected in the condensate trap, the float valve will open and permit the water to be exhausted, the water in some cases exhausting to atmosphere but usually, by reason of a suction pump being employed, it is exhausted at sub-atmospheric pressure. The float valve normally closes communication between the exhaust side of the condensate trap and the heat exchanger. If a vacuum pump is employed, the vacuum created by the pump cannot operate through the trap to remove air and vapors from the system. To eliminate this difficulty, condensate traps are frequently provided with a by-pass around the float valve, the by-pass having a thermic valve therein. This valve enables communication to be maintained around the float valve when the thermic valve is open. The thermic valve has a heat responsive element for actuating it, the arrangement being such that as long as air is being exhausted from the heat exchanger, the valve will be open but as soon as hot steam hits the thermic element, the valve will close and further communication between the heat exchanger and the exhaust side of the condensate pump is cut off until the thermic element has again cooled off. The purpose of such an arrangement is to enable a sub-atmospheric pressure to be maintained in the heat exchanger to lower the temperature at which the steam is condensed in the heat exchanger thus enabling more heat to be extracted from the steam. That is to say, that under vacuum the boiling point of water is reduced so that the steam instead of condensing at approximately 212° F. may condense around 170° F. for example, and the water flowing out of the condensate trap therefore, instead of being near the boiling point will be considerably below the boiling point and the heat units representing this difference in temperature will be used in the heat exchanger.

The present invention is for an improvement in systems of this kind by means of which a greater amount of heat may be extracted from each pound of steam supplied to the heat exchanger. The term "pound of steam" as used herein means a volume of steam necessary to produce a pound of water as distinguished from a unit of pressure. In a system of the class above described and to which the present invention relates, when the live steam enters the heat exchanger it contacts the cold walls of the heat exchanger and is condensed, creating a high vacuum in the system. This vacuum can only be relieved by additional steam being admitted to the heat exchanger. In order to relieve the vacuum, large amounts of steam are admitted through the regulating valve that controls the admission of steam to the heat exchanger. According to the present invention the admission of steam to the system is controlled so as to produce a more uniform flow of steam into the heat exchanger and enable it to be more effectively utilized whereby the steam consumption is materially decreased and the heat supplied by the steam is more effectively extracted.

My invention further provides a novel form of valve for use in systems of this kind by means of which these results can be accomplished in a most satisfactory manner.

My invention may be readily understood by reference to the accompanying drawings in which Figure 1 is a schematic view of a heat exchange system embodying my invention and wherein my especially designed valve is employed;

Figure 2 is a view similar to Figure 1 illustrating a modification of my invention wherein the valve shown in Figure 1 is omitted and other equipment used in its place;

Figure 3 is a vertical transverse section through the valve;

Figure 4 is an elevation on a smaller scale of the valve shown in Figure 3, the view of Figure 4 being at 90° to the view of Figure 3;

Figure 5 is a transverse section in the plane of line V—V of Figure 3;

Figure 6 is a transverse section in the plane of line VI—VI of Figure 3;

Figure 7 is a detailed perspective view of one of the two cooperating disk elements forming a part of the valve;

Figure 8 is a similar view of another of said cooperating disk elements; and

Figure 9 is a perspective view of a third element which is used in conjunction with the disk element shown in Figures 7 and 8.

Referring first to Figure 1 of the drawings, A designates a heat exchange system comprising a source of steam at a pressure above atmospheric pressure, the supply line being designated 2, and 3 is a pressure regulating valve for controlling the inflow of steam to the heat transfer system indicated by pipes 4 and radiators 5. Leading from the radiators or other condensing elements 5 are pipes 6 that connect with an exhaust line 7. The exhaust line 7 flows into a conventional condensate trap 8. It will be understood that while the system is illustrated as having radiators 5 as the condensing elements, this is only diagrammatic and the condensing elements 5 may be of any other form or may comprise merely steam coils immersed in either gaseous or liquid fluid to be heated.

The condensate trap 8 has a float valve 9 therein which controls a discharge port 10 leading to a discharge line 11. The pipe 11 is illustrated as leading to an exhaust pump 12 and at 13 is a spring loaded relief valve through which air may enter the pipe 11 if the suction in the system becomes too great.

So much of the system as has been described is common in the art and forms no part of the present invention per se. It will be observed that if there were no connections around the condensate trap 8, the exhaust pump 12 could not operate to exhaust air or fluid from the heat exchange system because when there is no condensate in the trap 8, or when the amount of condensate is insufficient to lift the float valve 9, the discharge passage 10 is closed by the float valve and when liquid rises to a point where the float valve 9 is open, the liquid itself would tend to prevent communication from the pump to the heat exchange system.

In order to avoid this difficulty, it is customary at the present time to provide a by-pass leading from the top of the condensate trap through a thermally controlled valve to the pipe 11. This is schematically illustrated in Figure 2 where the trap 8 is illustrated as being provided with a by-pass port 14 in which is a thermally expansible element 15 which controls the flow of fluid through the port 14 into branch pipe 16 leading to the pipe 11. These thermally controlled valves are extensively used in condensate traps at the present time and also form no part of the present invention per se. The valves are arranged to permit the suction pump to communicate with the heat exchange system around the thermic valve 15 until such time as steam contacts the thermic valve when the thermic valve closes and cuts off further communication between the heat exchange system and the pump or exhaust line. For various mechanical reasons, including the limited amount of expansion and because of the suction against which the valve has to work, the valve 15 may control only a very small orifice as compared to the total capacity of the heat exchange system. With such a system, it may be assumed that the system is first started up. The exhaust pump 12, if the system is a subatmospheric or vacuum system, operates to draw the air out of the heat exchange system and the pressure regulating valve 3 serves to admit steam to the heat exchange or condensing system. The pump 12 is satisfactory to maintain a certain amount of vacuum in the system, and when the vacuum increases above this point, the vacuum pump shuts off. In the operation of the system under the conditions described, the air being drawn out of the system by the suction of the pump is replaced by steam. The steam entering the condensing system which system is cold or relatively cold, is very rapidly condensed. This builds up a high vacuum in the system very rapidly. Some of the vacuum may be relieved by air entering through the relief valve 13 and passing through the thermic valve 15 into the system, but because of the restricted port around the thermic valve 15, the rate at which air under pressure enters the system is relatively slow. Also, if the thermic element happens to have been expanded by the steam which first enters the system, the thermic valve will close the by-pass and air admitted through the relief valve 13 cannot flow back into the system until the thermic valve has cooled. In order to relieve the vacuum in the system, steam is therefore drawn through the pressure reducing or regulating valve 3 at a much greater rate than would be the case if the normal differential pressure in the system were not destroyed by this condensing of the steam.

The present invention is designed to relieve this condition. One simple way of accomplishing this is illustrated in Figure 2 wherein a by-pass pipe 17 is provided one end of which connects into the pipe 11 and one end of which connects into the pipe 7 in advance of the trap 8. A check valve 18 is provided in this by-pass connection, the check valve being an inwardly opening check valve; i. e., one that opens toward the condensing units 5. A check valve 19 is placed in the pipe line 7 in advance of the trap 8, this being an outwardly opening check valve; i. e., that opens toward the discharge line 11. Hand operated valves are indicated at X and X'.

With this arrangement, when suction is applied to the line 11 to bring steam into the condensing or heat exchange system, the check valve 18 is held closed so long as the pressure in the system 7 is greater than the pressure in the line 11 and air is exhausted from the system through the outwardly opening check valve 19 and the thermic valve 15. If the steam condenses tending to create a reduced pressure in the heat exchange system below the desired differential at which the system is intended to operate, air may flow back through the pipe 11 through the by-pass 17 and the check valve 18 into the system to relieve the reduced pressure condition thus avoiding a sudden heavy surge of steam through the valve 3. The by-pass 17 and valve 18 at such a time allow an unrestricted reverse flow of air so that a much greater volume of air can flow back into the system than where the thermic valve 15 permits the only reverse flow. At the same time that the check valve 18 opens, the check valve 19 is held closed by the reduced pressure in the heat exchange system so that water cannot be drawn back into the system from the trap 8 nor will the thermic valve be abnormally cooled by air flowing back through the valve. The by-pass with the check valve thus affords a simple means for preventing heavy surges of steam being drawn in through the pressure regulating valve 3 and where the by-pass is used in a vacuum system as described, it enables the desired absolute pressure to be more nearly uniformly maintained in the system. This same means may be used where the system is operated as a pressure system. In a pressure system there may be high pressure steam supplied to the line 2 and perhaps only one or two pounds of steam pressure should be supplied to the condensing units 5. In the operation of the system as a pressure system, the steam coming into the condensing units 5 displaces the air in the system, and when the steam reaches the thermic valve 15, this valve closes and thereafter the pressure is maintained in the system. However, for various reasons a condition may arise where the steam in the system is very suddenly condensed which would produce a reduced pressure which would result in a surge of steam being supplied through the regulating valve 3 if the by-pass 17 and check valve 18 were not provided. Through the provision of this by-pass and check valve, the pressure in the system can be maintained more nearly uniform even when the system is operated as a pressure system as distinguished from a vacuum system, and a saving of steam will result.

While the arrangement shown in Figure 2 will function to effect a considerable saving in steam, a much more satisfactory arrangement is provided through the system illustrated in Figure 1 which employs an especially constructed valve shown in detail in Figures 3 to 9 inclusive. In Figure 1 the condensing system is the same as that illustrated in Figure 2, but instead of there being a by-pass 17 with a simple check valve used in conjunction with a thermic valve on the trap, the thermic valve and conventional check valve are eliminated. In this arrangement there is a by-pass pipe 20 which opens into the chamber of the condensate trap above the liquid level through a valve 21. The valve 21 is illustrated as having the lower ends of its body screwed into the port at the top of the condensate trap. The valve 21 has the outlet connection into which the pipe 20 is screwed at the side of the valve body, the outlet connection being designated 22. The interior of the valve body is provided near the lower end thereof with a central port 23, a valve seat 24 being provided at the lower face of the port. There is a spider at 25 in the body above the port providing a guide for a valve stem 26 which stem has a valve element 27 thereon that cooperates with the seat 24. Formed inside of the valve body above the spider 25 is a longitudinally extending fin or rib 28. On the upper end of the valve stem 26 is a shoulder 29 and set on the shoulder 29 is a flat disk-like member 30 shown in detail in Figure 8, one side of the disk being a semi-circle the curvature of which conforms to the interior of the valve body and which has a notch 31 therein into which the rib 28 extends, the rib providing a key to hold the disk from turning inside the valve body. The other side of the disk is elliptical and its minor axis is less than the diameter of the interior of the casing so that this side of the disk is spaced away from the interior of the valve casing, this space being designated 30a in Figure 3. Set on top of the disk 30 is a second disk 32 shown in detail in Figure 7. This disk has the portion to one side of its center semi-circular with the curvature corresponding substantially to the curvature of the interior of the body and has its other side elliptical with both the major and minor axes of the elliptical portion less than the internal diameter of the valve body. The two disks 30 and 32 are positioned so that the semi-circular part of the disk 32 is over the elliptical part of the disk 30. The two disks in effect provide an adjustable shutter or diaphragm that can be made effectively larger or smaller by sliding the disk 32 radially with respect to the disk 30. By increasing or decreasing the size of this shutter, the free flow of fluid through the valve may be varied.

The disk 32 is provided with a rectangular opening 33 at the center thereof. This opening serves to receive a rib 34 on the guide member 35 (see Figure 9). This guide has a central opening 35a. The slot 33 is longer than the rib 34 so as to allow the disk 32 to slide in one direction only with reference to the member 34 while the top of the member 35 rests on top of the member 32. The member 32 is also provided with a bridge-like member 36 which member is fixed onto the surface of the disk 32 and is mounted in spaced relation to the surface of this disk and which has a central opening 37 therein, the opening 37 being elliptical with the long axis of the ellipse transverse to the long axis of the slot 33. The member 35 in the assembled structure is under the bridge member 36.

The valve stem 26 has a circular extension 26a above the shoulder 29 which extension is of circular cross section and which passes through the opening in the disk 30 and through the opening 35a in the guide member 35. Secured to the upper part of this circular portion 26a of the shaft is an eccentric cam 38 which is received in the elliptical opening 37 in the bridge member. Above the cam 38, the shaft 26 has a non-circular extension 26b which extension is illustrated in the drawings as being triangular in cross section. The arrangement is such that when the valve stem 26b is rotated, the cam 38 is rotated. This cam operating in the elliptical or non-circular opening 37 causes the disk 32 to be slid in a crosswise direction over the surface of the disk 30. It is through this cam arrangement that the effective area of the shutter or diaphragm is changed. The disk 32 has a notch 32a in its periphery for engaging the rib 28 when the disk 32 is retracted to overlap the disk 30 to the maximum extent and allow the maximum free passage of fluid through the valve.

The valve casing is provided with a removable bonnet 40 through which is threaded an axially extending operating member 41 which member has a bore 42 extending part way through it from the innermost end thereof. At the top of the bonnet is a gasket 43 and a handle 44 is secured to the top of the operating member 41.

The upper end of the extension 26b of the valve passes through a non-circular opening in a member 41a that is screwed to the lower end of the operating member 41, there being a screw in the end of the stem 26b inside the member 41a to prevent the stem 26b from pulling out endwise through the cap or member 41a. The arrangement is such that an upwardly moving stream of fluid flowing through the valve will exert a pressure against the adjustable shutter 30—32 to lift the valve 27 into contact with the seat 24. During this lifting movement, the non-circular stem 26b telescopes into the chamber 42 in the operating member 41. The valve 27 is thus free to move up and down at all times. The valve is usually set in the vertical position so that the valve 27 is biased or urged down by gravity and is moved in the opposite direction by fluid flowing upwardly through the valve. The differential pressure necessary to operate the valve depends on whether the adjustable shutter or diaphragm 30—32 is expanded or contracted. When it is expanded it substantially limits the free flow of fluid through the valve and thus a very slight pressure against the under-surface of the adjustable shutter will lift the valve 27 against its seat, whereas if the adjustable shutter is collapsed, there will be a considerable passage for the free flow of fluid around the shutter and therefore a greater differential in pressure on opposite sides of the shutter will be required to lift the valve 27 against its seat 24.

By turning the handle 44 in one direction, the valve stem 26b can be rotated to turn the cam 38 and expand the shutter, and by moving it in the opposite direction the cam can be operated to contract the shutter. The rib 28 of course allows the shutter to slide up and down while holding it from rotating when the cam 38 is rotated. By turning the handle 44 in one direction or the other the effective area of the diaphragm can be changed within a limited range to increase or decrease the differential pressure required for the closing of the valve 27. The handle 44 may carry an indicating pointer which rides over a scale secured to the outside of the valve body to indicate whether the shutter is open or closed.

Furthermore, by turning the handle 44 to screw the operating member up or down in the bonnet, the position of the valve 27 may be raised or lowered to change the distance that the valve 27 can move with respect to its seat 24. If the handle 44 is turned sufficiently far in one direction, the valve 7 will be pulled up against the seat 24. The valve thus can be used as a cut-off valve. By changing the normal distance between the valve 27 and its seat 24, the amount of free movement of the valve 27 can be changed to alter the sensitivity of the valve in one respect and this adjustment is complemented by the more important adjustment provided through the variable shutter 30—32. It will be evident, however, that if the handle 44 is turned to a point where the member 41 is screwed up so that there is only a slight clearance at the most between the valve 27 and its seat 24, a very small differential pressure on opposite sides of the shutter 30—32 will cause the valve 27 to be closed against its seat.

The valve mechanism described thus comprises an outwardly opening check valve in that fluid pressure acting against the shutter 30—32 will tend to move the valve toward a closed position, and once the valve has been closed, pressure in the same direction will tend to keep it closed. It acts as a pressure regulating valve or differential regulating valve in that by changing the effective area of the shutter 30—32 and also by changing the maximum distance between the valve 27 and its seat 24, the sensitivity of the valve to the flow of fluid through it will be changed, the increasing of the size of the compound shutter 30—32 making the valve more responsive to slight variations in pressure. Finally, the valve is a cut-off valve to prevent the flow of any fluid whatever through the valve.

When the valve as described is used in the position illustrated in Figure 1, it functions in the following way. As steam enters the condensing system, it forces air out through the valve unit 21, the valve unit being open. If there is a suction pump in the exhaust line, or if the system is a pressure system so that fluid tends to flow too fast in an outgoing direction through the valve, the outgoing stream of fluid will act against the adjustable shutter to completely close the valve 27 against a seat 24. This prevents the steam from flowing into and through the system too fast. In a vacuum system, for example, where the pump 12 is exerting a suction on one side of the adjustable shutter and there is a fluid pressure on the other side, the valve will close when the differential exceeds a certain amount. When some of the steam in the condensing system condenses lowering the pressure in the heat exchange system, the valve 27 again opens allowing the pump 12 to withdraw fluid from the heat exchange system. When the rate of flow of fluid through the valve again becomes too great, indicating too great a differential between the heating system side of the valve and the pump side, the valve will again close until the pressure on the heating side has again dropped. If, on the other hand, the pressure on the heating side of the system drops too suddenly or too far, air may flow into the heating system through the exhaust pipe 11 and through the pipe 20 and back through the valve unit 21 into the trap and from the trap back into the heating system. Thus, any abnormally low pressure in the heating system will be relieved through the valve 21 and no surge of steam will be drawn through the supply valve 3. The valve, once it has been set to the requirements of the heating system, automatically acts to maintain a proper differential between the pressure on the heating side of the valve and the exhaust side. Thus it eliminates any requirement for a thermic element. It functions automatically as a check valve and suction-relief valve. Where the valve is used it has been demonstrated that a very considerable saving in steam can be effected and that in a vacuum system, for example, the water can be discharged from the exhaust line 11 at an appreciable lower temperature than the condensate is discharged from heating systems without such a valve, thus indicating that the heat is more effectively extracted from the steam.

The valve is relatively inexpensive to manufacture and it can be coupled into present heating system where condensate traps, especially condensate traps of the type heretofore employing thermic valve, have been used. Little time is required to install the valve, and as above indicated, the valve can be used advantageously in either pressure systems or vacuum systems.

While I have illustrated and described a present preferred valve construction, it will be understood that this is by way of illustration and that various changes and modifications may be made in the construction of the valve as well as in the type of heating system with which the valve is used within the contemplation of my invention and under the scope of the following claims.

I claim:

1. A heating system comprising a steam condensing unit, a regulating valve for supplying steam to the unit, an exhaust line with a condensate trap therein leading from the unit, and a by-pass around the trap having an inwardly opening outwardly closing check valve element therein responsive only to the difference in pressure on the inlet and outlet sides of the said trap.

2. A heating system comprising a steam condensing unit, a regulating valve for supplying steam to the unit, an exhaust line with a condensate trap therein leading from the unit, a pipe by-passing the condensate trap in the exhaust line, and an adjustable check valve in the by-pass opening toward the condensing unit and closing toward the exhaust side of the system and responsive only to differences in pressure on the inlet and outlet sides of the trap.

3. A heating system comprising a steam condensing unit, a regulating valve for supplying steam to the unit, an exhaust line with a condensate trap therein leading from the unit, and a by-pass around the trap having an inwardly opening outwardly closing adjustable check valve element therein, said check valve being adjusted to close when a predetermined maximum differential is reached at the opposite sides of the said trap.

4. A heating system comprising a steam condensing unit, a regulating valve for supplying steam to the unit, an exhaust line with a condensate trap therein leading from the unit, a by-pass in the exhaust line around the trap, a check valve device in said by-pass which opens inwardly and closes outwardly, said valve being biased to remain open until a predetermined maximum differential pressure on opposite sides of the valve is reached and being responsive only to the difference in pressure on the inlet and outlet sides of the said trap.

5. A heating system comprising a steam condensing unit, a regulating valve for supplying steam to the unit, an exhaust line with a condensate trap therein leading from the unit, a by-pass in the exhaust line around the trap, a check valve device in said by-pass which opens inwardly and closes outwardly, said check valve device having a movable valve element biased to move toward an open position, and means for adjustably limiting the range of movement of the valve, said valve being responsive only to the difference in pressure on the inlet and outlet sides of the said trap.

6. A heating system comprising a steam condensing unit, a regulating valve for supplying steam to the unit, an exhaust line with a condensate trap therein leading from the unit, a by-pass in the exhaust line around the trap, a check valve device in said by-pass which opens inwardly and closes outwardly, said check valve device being responsive only to the difference in pressure on the inlet and outlet sides of the said trap, said check valve device having a movable valve element biased to move toward an open position, means for adjustably limiting the range of movement of the valve, and means associated with the check valve unit for varying the effectiveness of the biasing force.

BERNARD J. INGRAM.